US008635529B2

(12) United States Patent
Shanmugarajah

(10) Patent No.: US 8,635,529 B2
(45) Date of Patent: Jan. 21, 2014

(54) PAGE TURNING IN ELECTRONIC DOCUMENT READERS

(76) Inventor: Anusha Shanmugarajah, Mississauga (CA)

( * ) Notice: Subject to any disclaimer, the term of this patent is extended or adjusted under 35 U.S.C. 154(b) by 156 days.

(21) Appl. No.: 13/408,993

(22) Filed: Feb. 29, 2012

(65) Prior Publication Data
US 2013/0227408 A1 Aug. 29, 2013

(51) Int. Cl.
*G06F 17/00* (2006.01)
(52) U.S. Cl.
USPC .......................................................... 715/277
(58) Field of Classification Search
USPC .................................. 715/203, 204, 251, 277
See application file for complete search history.

(56) References Cited

U.S. PATENT DOCUMENTS

| | | | |
|---|---|---|---|
| 6,772,156 B1 * | 8/2004 | Rogers et al. .......................... 1/1 |
| 8,533,622 B2 * | 9/2013 | Estrada et al. ................. 715/776 |
| 2004/0054569 A1 * | 3/2004 | Pombo et al. ..................... 705/7 |
| 2006/0133664 A1 * | 6/2006 | Hong et al. .................... 382/154 |
| 2007/0124201 A1 * | 5/2007 | Hu et al. .......................... 705/14 |
| 2008/0077492 A1 * | 3/2008 | Ho et al. .......................... 705/14 |
| 2008/0222552 A1 * | 9/2008 | Batarseh et al. ............... 715/776 |
| 2009/0198036 A1 * | 8/2009 | Duffy .............................. 528/85 |
| 2010/0060475 A1 * | 3/2010 | Choi ............................. 340/689 |
| 2010/0299205 A1 * | 11/2010 | Erdmann et al. ........... 705/14.54 |
| 2011/0234613 A1 * | 9/2011 | Hanson et al. ................. 345/589 |
| 2012/0036482 A1 * | 2/2012 | Haynes et al. ................. 715/838 |
| 2012/0102424 A1 * | 4/2012 | Chong et al. .................. 715/776 |
| 2012/0113019 A1 * | 5/2012 | Anderson ...................... 345/173 |
| 2012/0143590 A1 * | 6/2012 | Ajima .............................. 704/2 |
| 2012/0240075 A1 * | 9/2012 | Kim et al. ...................... 715/776 |
| 2013/0191728 A1 * | 7/2013 | McKinney et al. ............ 715/243 |

* cited by examiner

*Primary Examiner* — Laurie Ries

(57) ABSTRACT

An electronic document reader includes a display configured to display at least a page of an electronic document, a memory configured to store indications of sets of pages of the electronic document, a user interface for receiving commands, and a processor connected to the display, the memory, and the user interface. The processor is configured to cause pages to be displayed on the display. In response to a first command, the processor can use a random number generator to select a new page to display from a first set of pages, the first set of pages excluding a second set of previously displayed pages.

20 Claims, 9 Drawing Sheets

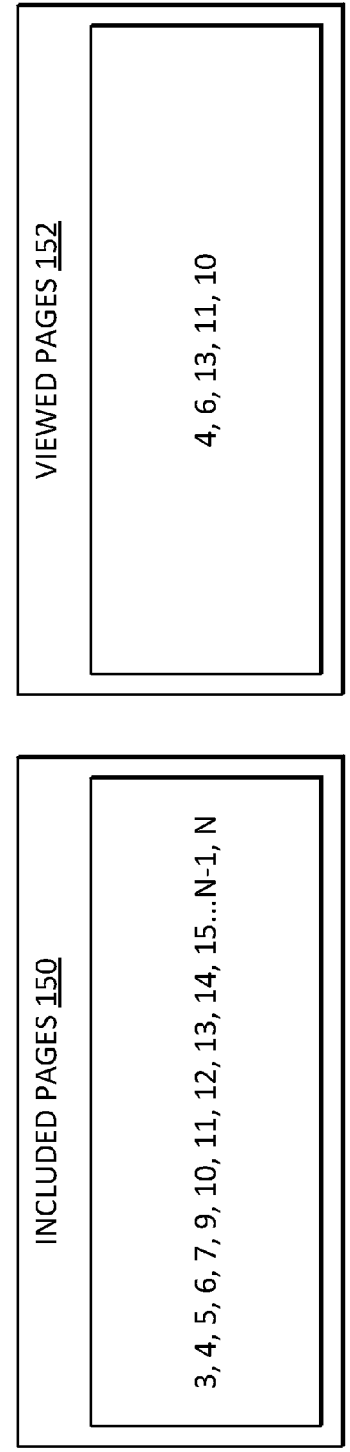

PAGE TURNING IN ELECTRONIC DOCUMENT READERS

FIELD

This disclosure relates to electronic devices, and more particularly, to electronic devices configured to display electronic documents to users.

BACKGROUND

Electronic document readers allow viewing of electronic documents and provide associated functions to enhance this. For example, a user can download documents to the reader, select a document to view, and sequentially turn pages of the document being viewed. However, paper documents, such as books, still have advantages over electronic documents.

BRIEF DESCRIPTION OF THE DRAWINGS

The drawings illustrate, by way of example only, embodiments of the present disclosure.

FIG. 8 is a table defining sets of pages.

FIGS. 9a-b show arrays defining sets of pages.

DETAILED DESCRIPTION

Figure 1:
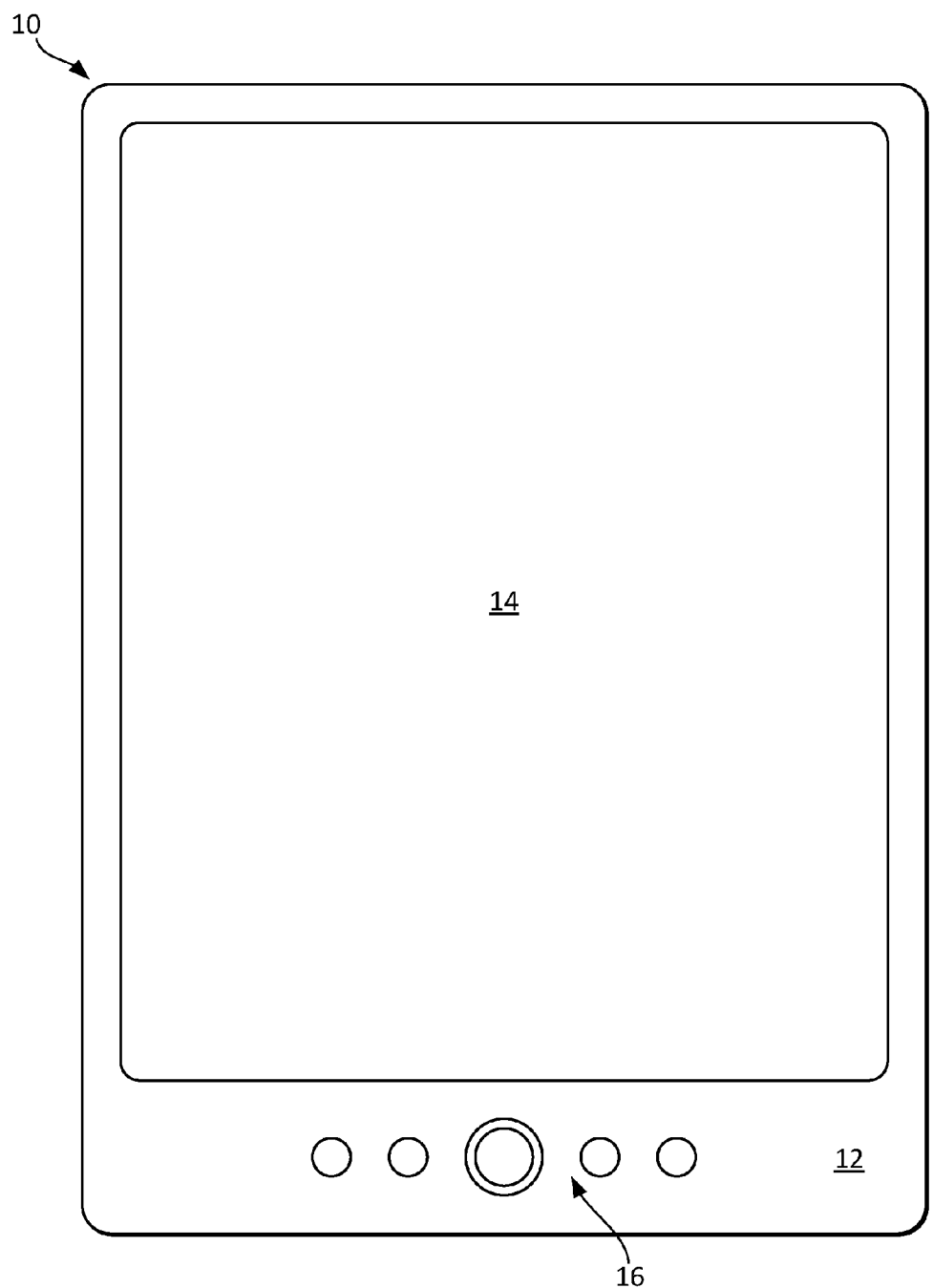
FIG. 1 is a front view of an electronic document reader.

FIG. 1 shows an electronic document reader 10. The electronic document reader 10 is an electronic device and may be known as an e-reader, a tablet or tablet computer, an e-book, or similar. The electronic document reader 10 is capable of displaying electronic documents, such as electronic books (i.e., e-books), magazines, newspapers, and Web pages. The electronic document reader 10 may have other capabilities as well, such as the capability to play electronic games or music.

Figure 2:
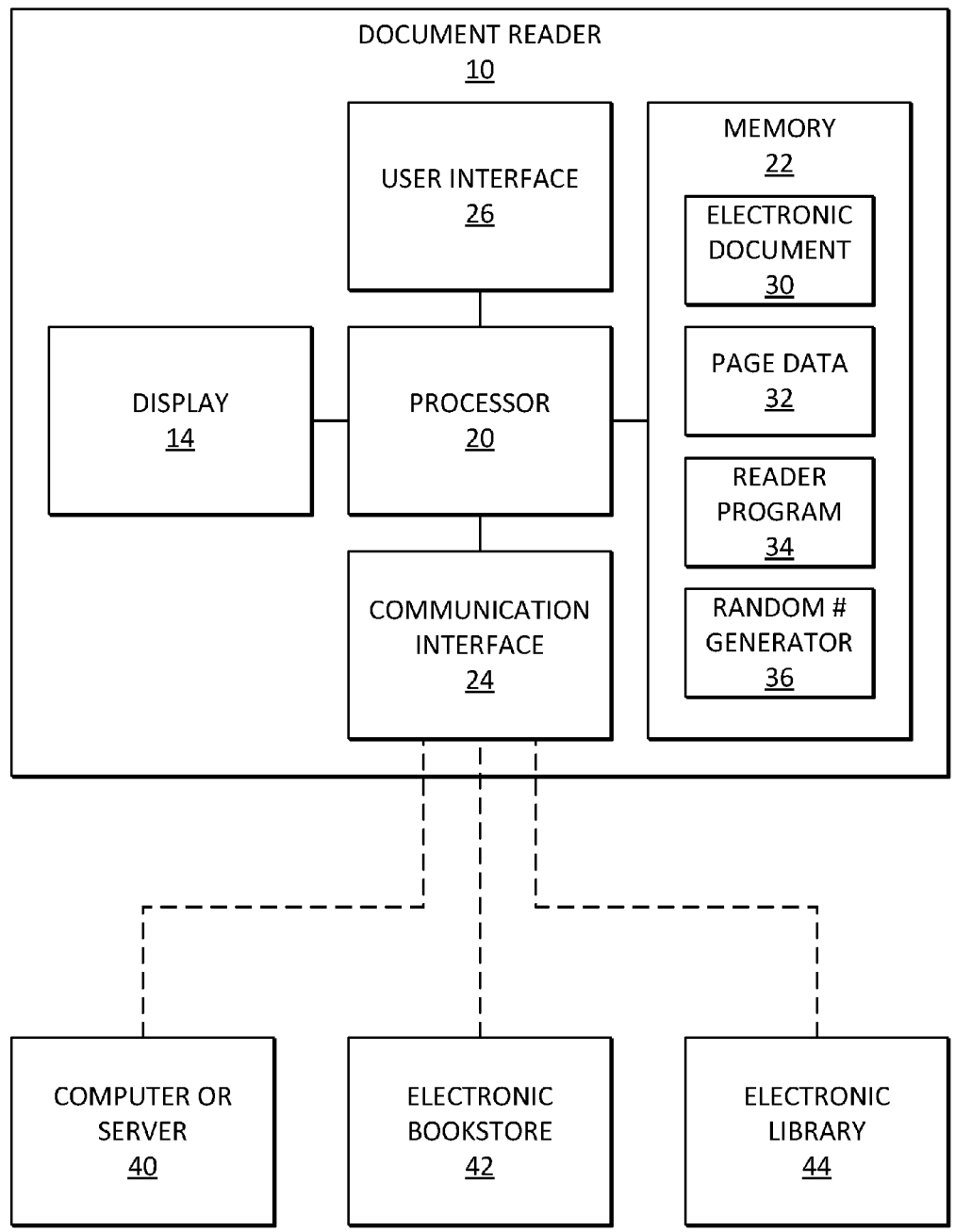
FIG. 2 is a block diagram of the electronic document reader.

The document reader 10 includes a housing 12, a display 14, and a user interface (see ref. 26 of FIG. 2). The housing 12 serves to hold or house components of the document reader 10 and can be made of plastic, metal (e.g., aluminum), or other material. The display 14 functions to display information to a user of the document reader 10, and can be configured to display at least a page of an electronic document. The display 14 can include an electronic paper (e-paper) or electronic ink (e-ink) display, a light-emitting diode (LED) display, a liquid crystal display (LCD), or the like. The user interface allows interaction with the document reader 10 by the user and may include one or more buttons 16, a touch-sensitive element of the display 14 (i.e., the display 14 is a capacitive or resistive touch-screen device), a combination of such, or another device.

As shown in FIG. 2, the document reader 10 further includes a processor 20, memory 22, and a communication interface 24.

The processor 20 can include a microprocessor, such as single-core or multi-core microprocessor. The processor 20 may include more than one processor. The processor 20 is connected to the display 14, the memory 22, and the user interface 26. Such connections can be facilitated by an input-output interface, bus, or the like.

The memory 22 can include non-volatile or volatile memory. The memory 22 can include flash memory, random-access memory (RAM), or read-only memory (ROM). The memory 22 may include a solid-state device or another kind of device, such as a hard disk. The memory 22 is configured to store one or more electronic documents 30 as well as data 32 concerning the electronic documents 30. The data 32 may be metadata and, specifically, may be page data including indications of sets of pages of the electronic document 30. The data 32 may be stored in a separate file or structure from the electronic document 30 or may be stored in the same file as the electronic document 30. The memory 22 may further store a reader program 34 that defines instructions that are executable by the processor 20 to configure the processor 20 to display the electronic document 30 on the display 14. The reader program 34 may reference a random number generator 36, which may be an entity separate from the reader program 34 or may be included as part of the reader program 34.

In this example, the memory 22 is contained in the document reader 10. In other examples, the memory 22 may be located at another device, such as a remote server that forms part of a cloud storage system. Such cloud memory does not preclude the document reader 10 also having local memory. Accordingly, in still other examples, the memory 22 includes memory local to the document reader 10 as well as memory at a remote server. The memory 22 can be any memory at any location that is accessible to the processor 20.

The processor 20 can cause pages of an electronic document 30 to be displayed on the display 14 according to commands received at the user interface 26. Such commands can include selecting a particular electronic document 30 to display, moving to a chapter or section of the electronic document, turning to a next or previous page of the electronic document 30, turning to a specified page of the electronic document 30 (e.g., by specifying a page number), storing in the memory 22 a note or highlight for the electronic document 30, and the like. Such commands can be effected by one or more of the pressing of the buttons 16 or by touches, taps, swipes, or other gesture at the touch-sensitive display 14.

In other examples, such as when the document reader 10 is embodied as a desktop or notebook computer, commands at the user interface 26 can take the form of mouse or trackball movements, mouse or trackball clicks, keyboard key presses, and the like.

The communication interface 24 can include a wired or wireless interface for communication with remote sources of electronic documents. The communication interface 24 can include one or more of a cable (e.g., a universal serial bus or USB cable) and a wireless network adapter (e.g., a Wi-Fi adapter, Bluetooth® radio, or cellular radio). The remote sources of electronic documents can include a computer or server 40, an electronic bookstore 42, or an electronic library 44. A remote source of electronic documents, such as the computer or server 40, may be the document reader 10 user's desktop or notebook computer that is wire or wirelessly connectable to the communication interface 24. The communication interface 24 allows the downloading of electronic documents 30 to the document reader 10 and may further allow uploading of electronic documents 30 to a remote source.

As will now be described in detail, the document reader 10 is capable of turning to pages of an electronic document 30 in a random manner. This may be advantageous when a user wishes to scan or skim the document 30 to assess its contents or when a user wants to explore the content of the electronic document 30 in an unplanned way. For example, if the electronic document 30 is a textbook, the user may be a student wishing to test her knowledge of the contents of the textbook. In another example, the electronic document 30 may be a book of quotations or puzzles that need not be enjoyed in sequential order. Turing to an unspecified random page can facilitate both of these needs as well as other needs. Moreover, as will be appreciated, the document reader 10 displays pages randomly, but also intelligently. A set of pages, as defined by page data 32, may be designated for display while another set of pages may be excluded. This can be advantageous in that a user may not want to view pages he has recently viewed and may not want to randomly view certain kinds of pages (e.g., a cover page or index pages).

Figure 3:
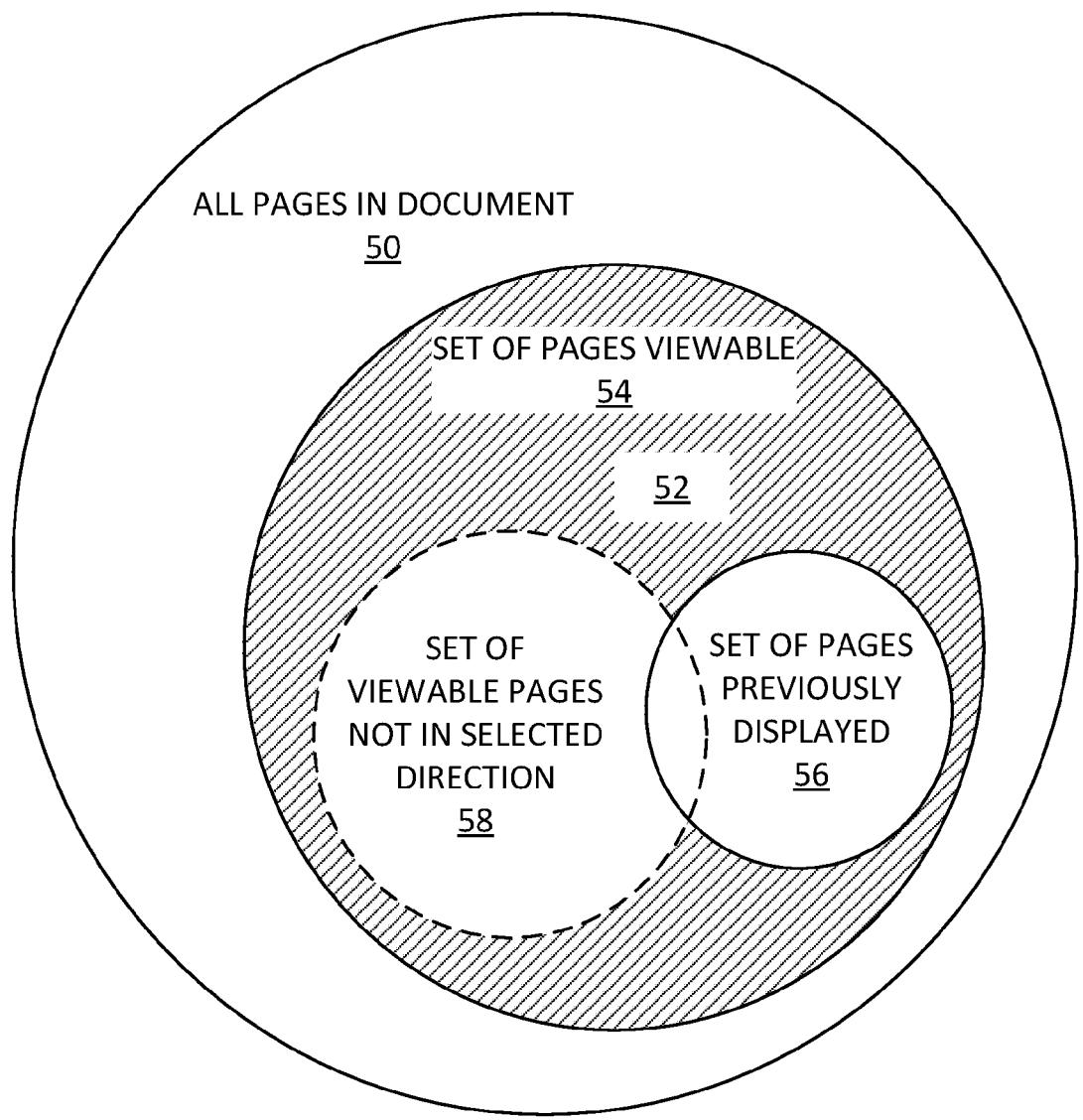
FIG. 3 is a diagram of sets of pages of an electronic document.

Referring to FIG. 3, page data 32 may define a first set of pages 52 (hatched area) as a subset of all pages 50 of the document. The first set 52 of pages may include pages defined as viewable 54 and may exclude a second set of previously displayed pages 56. Pages can then be randomly selected from the first set 52 for display in response to a command. As a new page from the first set 52 is displayed, an indication of the new page (e.g., its page number) can be added to the second set 56 so that this page is not randomly selected again. In addition, when the user specifies a page turning direction with the command, the first set of pages 52 may further exclude a third set of pages 58 that are not in the same direction as the command.

The processor 20 can select a random page by referencing the random number generator 36. Although the term random is used in this disclosure, it will be appreciated in the relevant arts that random may mean pseudo-random. Specifically, many processors are readily configurable to generate pseudo-random numbers that appear to humans to be random numbers. Accordingly, in one example, the random number generator 36 is executable by the processor 20 to cause the processor 20 to obtain a pseudo-random number within specified bounds.

Each of the methods discussed below is described in terms of the electronic reader 10. Each method may be implemented in the electronic reader 10 as one or more of a program, routine, subroutine, module, method, class, or other programmatic entity, such as the reader program 34 and random number generator 36, to configure the processor 20 to perform the steps of the method.

Figure 4:
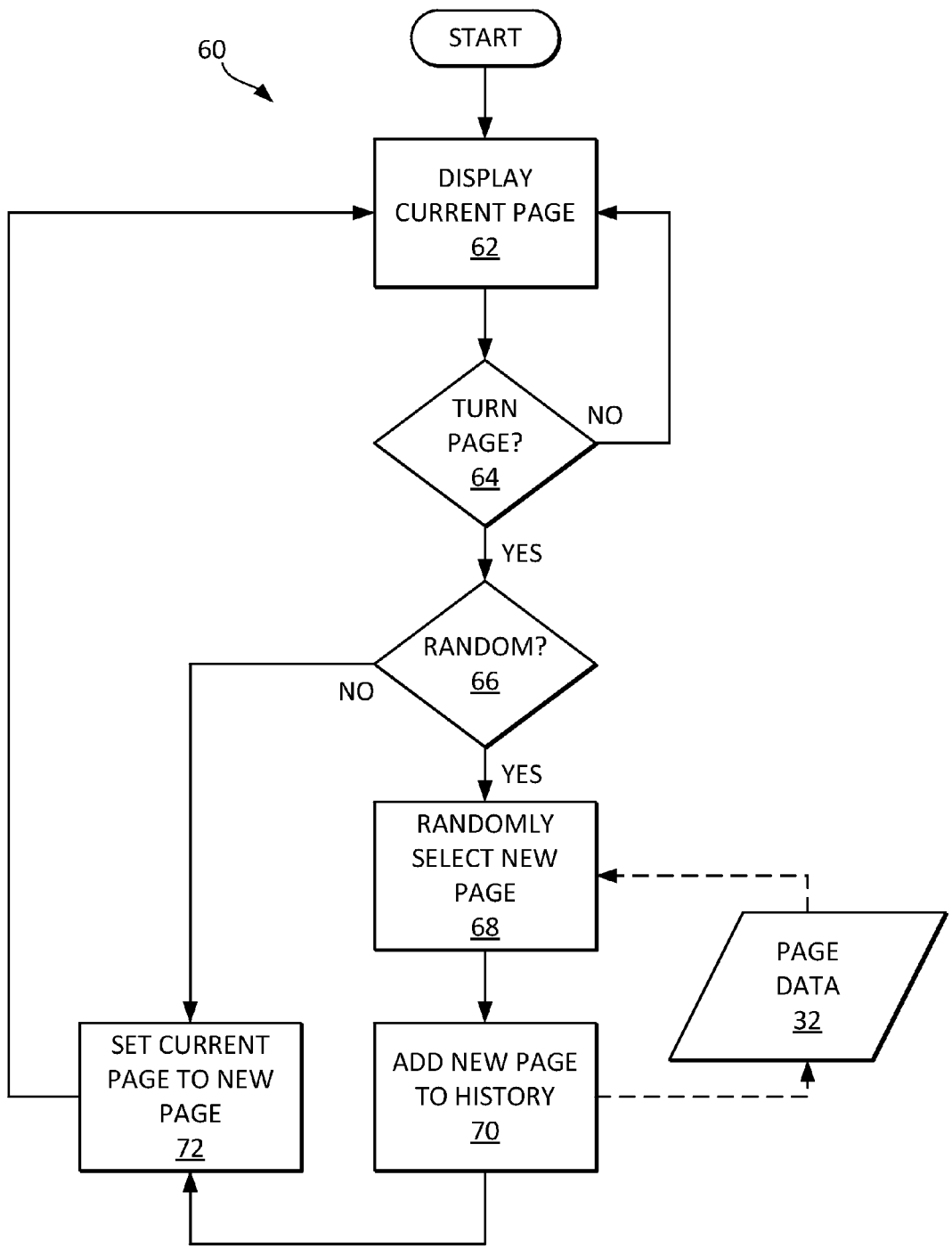
FIG. 4 is a flowchart of a method for turning a page of an electronic document.

FIG. 4 illustrates a flowchart of a method 60 for turning a page of an electronic document 30.

At step 62, a current page of an electronic document 30 is displayed on the display 14. Initially, the current page may be a page selected, for example, by the user sequentially turning pages, selecting a chapter from a table of contents, or selecting a page by number or using an index. The current page may be the first page or cover page of the electronic document 30 or may be the last page displayed when the user last closed the electronic document 30.

At step 64, it is determined whether the electronic document 30 is to be turned to a different page. The processor 20 may watch for such commands at the user interface 26, such that steps 62 and 64 are repeated when no command to turn the page is detected.

When a command is received at the user interface 26 to display a different page of the electronic document on the display 14, the processor 20 determines, at step 66, whether the command indicates a random page is to be selected for display. A user-selectable setting may be stored in memory 22 to indicate whether a normal page turn command is to be interpreted as a random page turn command. Alternatively, a command distinctly different from the normal page turn command can be defined as the random page turn command.

At step 68, in response to the random page turn command, the processor 20 uses the random number generator 36 to select a new page of the electronic document 30 from the first set 52 of pages of the electronic document 30 as indicated by the page data 32. As discussed with respect to FIG. 3, the page data 32 can prevent selection of a page that has already been viewed by indicating a second set of previously displayed pages 56 to be excluded from the first set 52.

Once a suitable new page has been randomly selected, an indication of the new page (e.g., its page number) is added to the second set of pages of the page data 52, at step 70, to prevent future random selection of the new page. The history of viewed pages is thus updated with each viewed page.

At step 72, the current page is set to the new page before step 62 is repeated to display the newly selected current page. Step 72 is also performed when a new page is selected by a normal page turning command as indicated by the arrival at step 72 from the negative branch of step 66. In another example of the method 60, the negative branch from step 66 proceeds to step 70 so that normally turned pages are also added to the history of viewed pages maintained at page data 32.

The method 60 can thus allow for random selection of pages of an electronic document without repetition of randomly viewed pages or without repetition of any previously viewed pages.

The steps of the method 60 may be performed in an order different from that described above. Steps may be combined to larger steps or separated into smaller steps.

Figure 5:
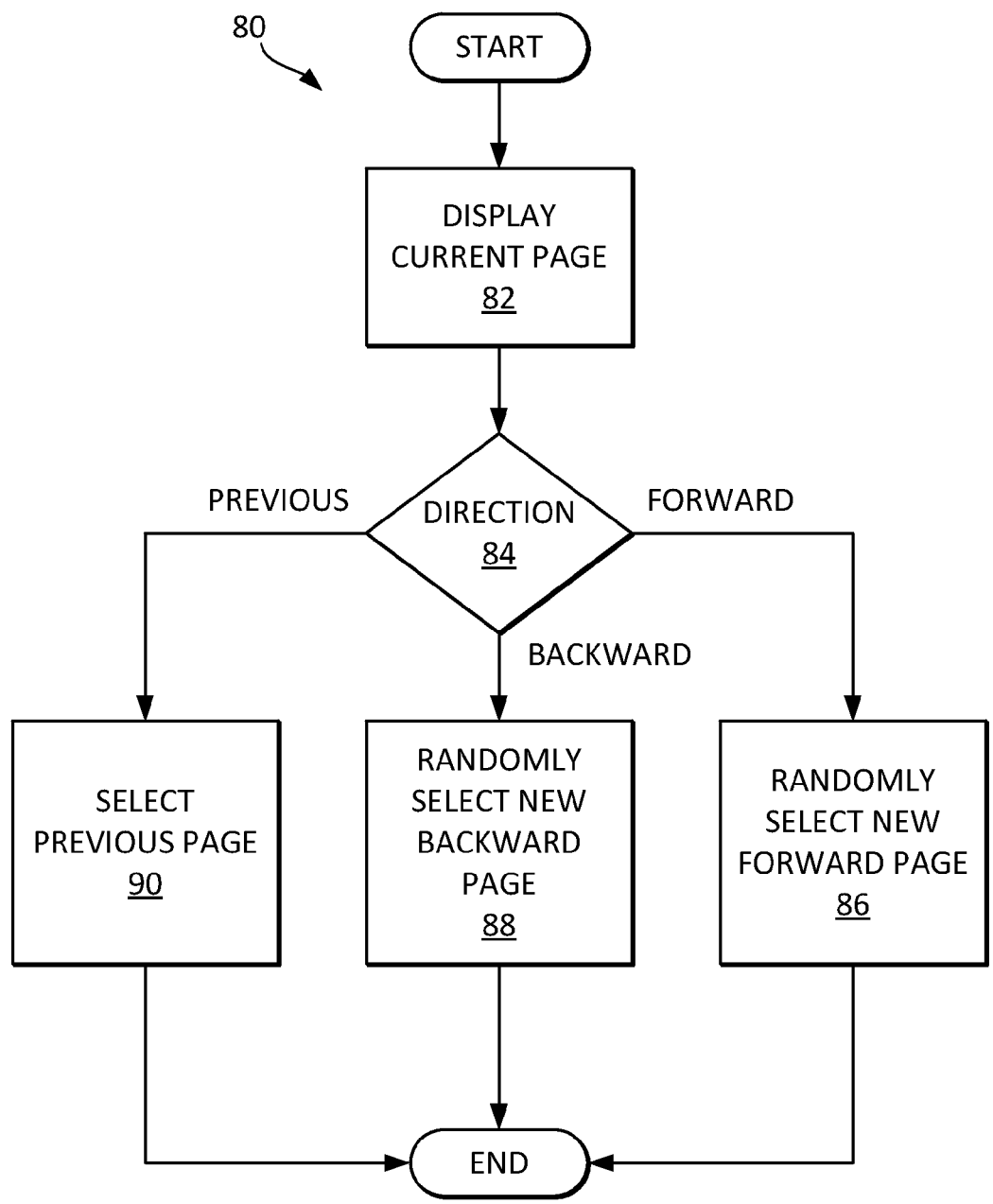
FIG. 5 is a flowchart of another method for turning a page of an electronic document.

FIG. 5 illustrates a flowchart of a method 80 for turning a page of an electronic document 30. The method 80 may be used in steps 62, 64, 66, and 68 of the method 60.

At step 82, a current page of an electronic document 30 is displayed on the display 14. Step 62 may be referenced for further detail.

At step 84, a command is received at the user interface 26 to turn to a different page. The command indicates a direction in the electronic document 30 from the current page to the different page.

When the page is turned in a forward direction, the processor 20, at step 86, uses the random number generator 36 to randomly select a page forward of the current page. That is, the randomly selected page is ahead of the current page. When page numbers are used, the randomly selected page has a higher page number than the current page. Referring to FIG. 3, the processor 20 randomly selects a page from the first set 52 of pages, which excludes the second set 56 of previously displayed pages and further excludes a third set of pages 58 that are not ahead of the current page.

On the other hand, when the page is turned in a backward direction, the processor 20, at step 88, uses the random number generator 36 to randomly select a page backward of the current page. That is, the randomly selected page is behind the current page. When page numbers are used, the randomly selected page has a lower page number than the current page. Referring to FIG. 3, the processor 20 randomly selects a page from the first set 52 of pages, which excludes the second set 56 of previously displayed pages and further excludes a third set of pages 58 that are not behind the current page.

If the page is turned in a previous direction, the processor 20, at step 90, selects the previously displayed page. The processor 20 can reference the page data 32 to determine which page is the previously displayed page.

Depending on the configuration of the user interface 26, the previous direction can be opposite the forward direction, opposite the backward direction, or the forward and backward directions can be opposite each other with the previous direction being a distinctly different direction. In one example, a left swipe on the touch-sensitive display 14 is the command to randomly turn the page in the forward direction, while a right swipe is the command to randomly turn the page in the backward direction, and a downward swipe returns to the previously displayed page. In another example, a left swipe on the touch-sensitive display 14 is the command to randomly turn the page in the forward direction, while a right swipe is the command to return to the previously displayed page. In another example, a left swipe on the touch-sensitive display 14 is the command to return to the previously displayed page, while a right swipe is the command to randomly turn the page in the backward direction. The above examples are not mutually exclusive and may be used at different times or in response to different commands at the user interface 26.

Accordingly, the method 80 can give the user the impression of flipping forward or backward through the electronic document 30 by an unspecified (i.e., random) number of pages.

The steps of the method 80 may be performed in an order different from that described above. Steps may be combined into larger steps or separated into smaller steps.

Figure 6:
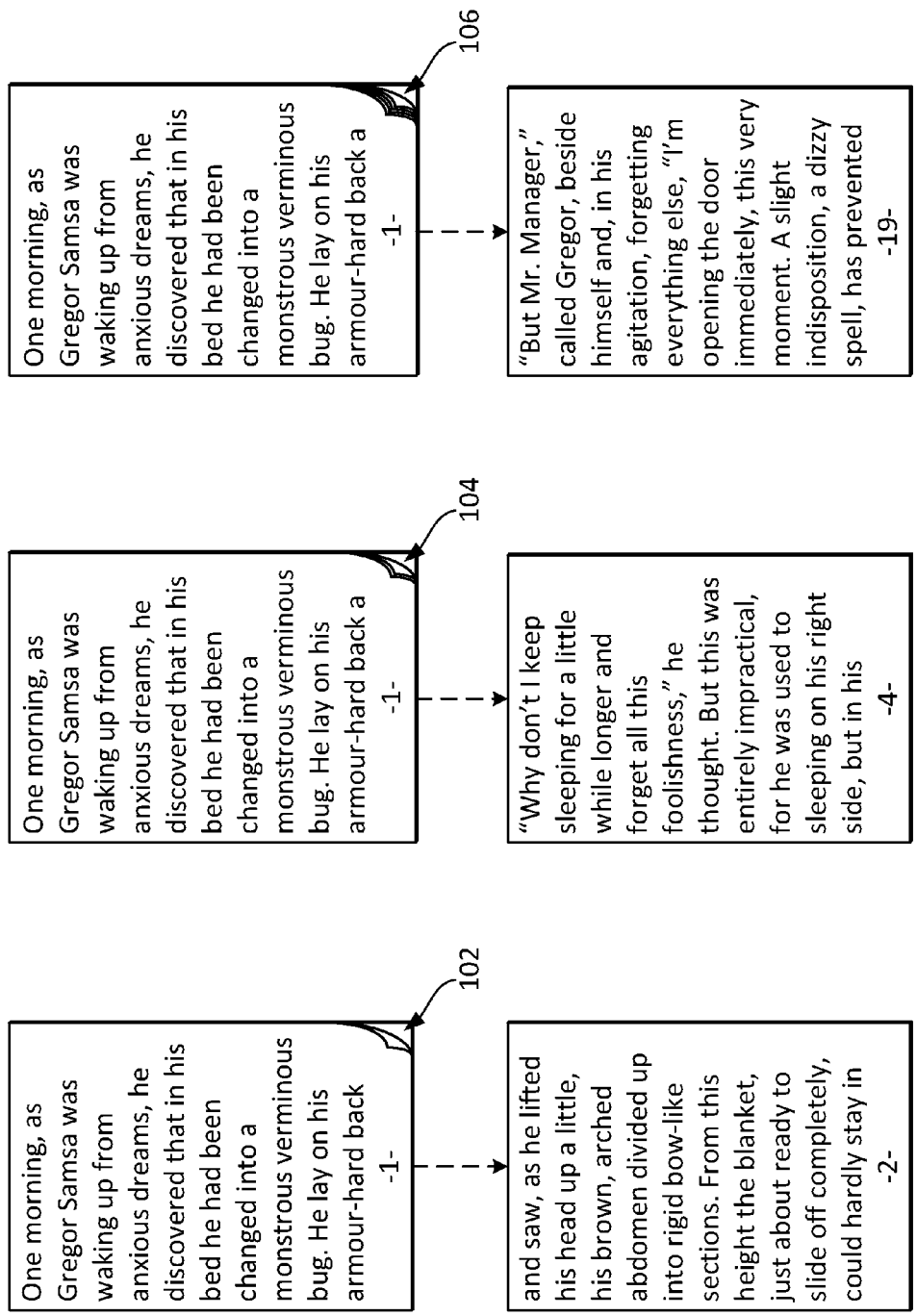
FIGS. 6a-c are diagrams of pages in an electronic document being turned.

FIGS. 6a-c show pages in an electronic document being turned.

In FIG. 6a, the page is turned from a page numbered "1" to a page numbered "2". The normal forward advance of the page can be indicated by a graphical element 102, such as an image that represents a single curved page corner. Similarly, a single backward page turn can be represented by a similar graphical element on the opposite bottom corner of the page.

In FIG. 6b, the page is turned from the page numbered "1" to a page numbered "4" in response to a command to turn pages randomly, as discussed elsewhere herein. This kind of advance of the page can be indicated by a graphical element 104, such as an image that represents several curved page corners. A similar backward page turn can be represented by a similar graphical element on the opposite bottom corner of the page. The number of pages turned between the current page and the new page can be indicated by the graphical element to let the user know approximately how many pages are being skipped by the random nature of the page turning. This is shown in FIG. 6c, where page "1" is turned to page "19" and a graphical element 106 visually indicates more pages are being turned than does the graphical element 104 of FIG. 6b.

The graphical elements 102, 104, 106 can be selected to approximately indicate the number of pages being turned by, for example, associating the graphical elements 102, 104, 106 with different quantities of pages. For example, the graphical element 102 indicates a single, normal page turn, the graphical element 104 indicates turning to a random page between 2 and 15 pages from the current page, and the graphical element 104 indicates turning to a random page more than 15 pages from the current page. Alternatively, the graphical elements 102, 104, 106 can be selected to accurately indicate the number of pages being turned by, for example, visually showing the same number of page edges or by showing the digits of the number itself.

The graphical elements 102, 104, 106 can alternatively be displayed at the tops of the pages.

Figure 7:
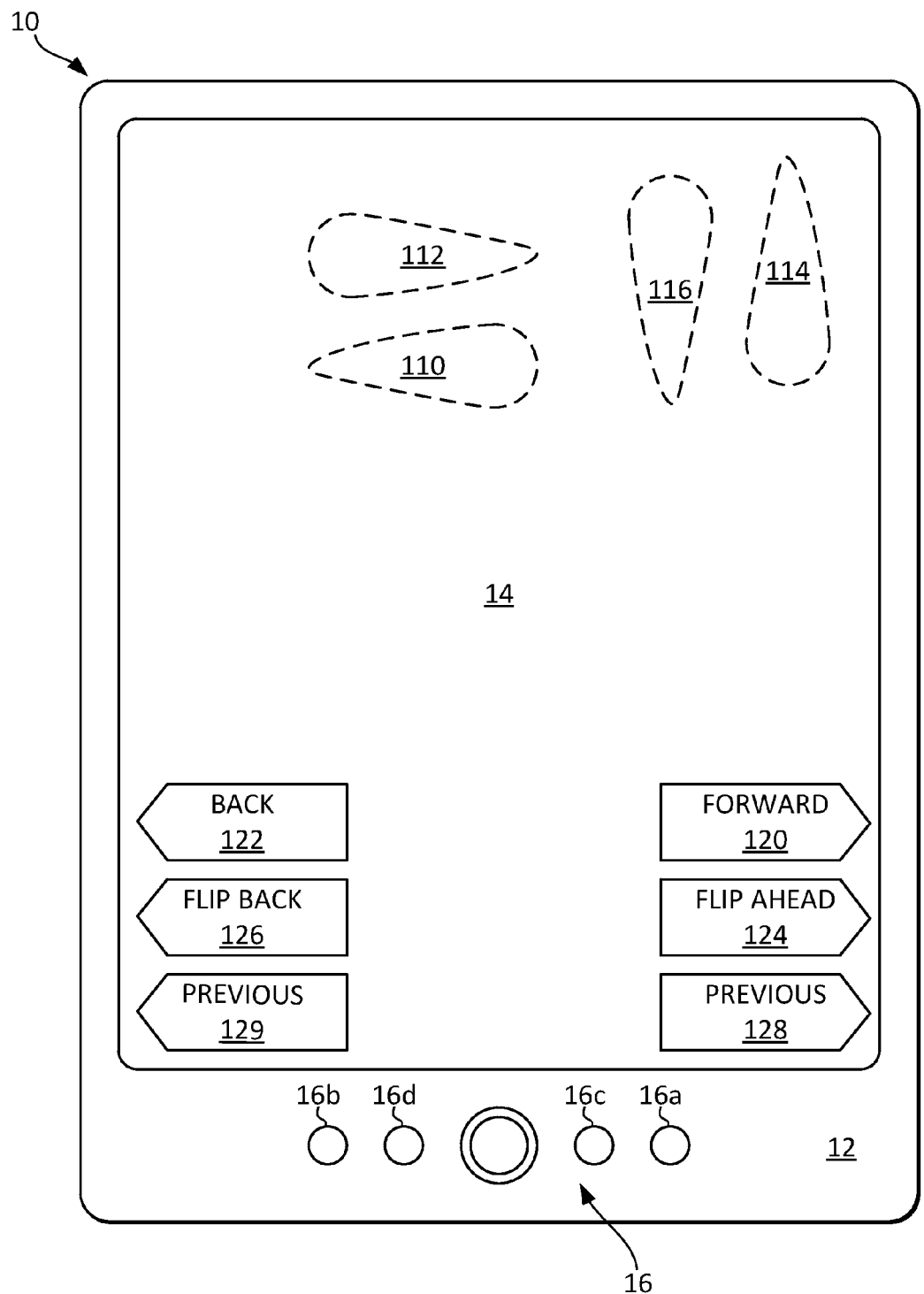
FIG. 7 is a front view of the electronic document reader showing page turning commands.

FIG. 7 shows different methods of generating page turning commands via the user interface 26. Not all of these methods need be implemented. Any of these methods, or other methods, can be used alone or in combination.

Different gestures, such as swipes, may be made on the touch-sensitive display 14 to turn a single page or randomly turn pages. For example, a left swipe 110 may be used as a command to turn forward by a single page. A right swipe 112 may be used as a command to turn backward by a single page. An up swipe 114 may be used as a command to turn forward to a random page. A down swipe 116 may be used as a command to turn backward to a random page.

Different visual elements, such as virtual buttons, may be provided on the touch-sensitive display 14 to turn a single page or randomly turn pages. For example, a forward button 120 may be used as a command to turn forward by a single page. A back button 122 may be used as a command to turn backward by a single page. A flip ahead button 124 may be used as a command to turn forward to a random page. A flip back button 126 may be used as a command to turn backward to a random page. A previous button 128 may be used as a command to turn forward to the previously viewed forward page. Another previous button 129 may be used as a command to turn backward to the previously viewed backward page. The virtual buttons 120-129 may be shown on the display 14 at certain times or in response to certain commands, so as to not obstruct the content of the electronic document being shown on the display 14.

Different physical elements, such as physical buttons 16a-d, may be provided on the housing 12 to turn a single page or randomly turn pages. For example, a first button 16a may be used as a command to turn forward by a single page. A second button 16b may be used as a command to turn backward by a single page. A third button 16c may be used as a command to turn forward to a random page. A fourth button 16d may be used as a command to turn backward to a random page.

FIG. 8 shows a table 130 defining sets of pages. The table 130 is an example of page data 32. The table 130 may be stored as metadata embedded in the electronic document, as a separate extensible markup language (XML) file, in a database table or tables, or in another format. The table 130 is illustrated as a table for explanatory purposes and can be stored with other structure.

Each of the pages of the electronic document 30 may be referenced by a page number 134 that uniquely identifies the page. Page numbers 134 can be different from page numbers that may be displayed on pages or screens as part of the content of the document 30. Page numbers 134 need not correspond to pages of the electronic document 30 and may represent screens of the electronic document 30 visible on the document reader 10. For example, a page number "43" of a printed textbook may actually correspond to a screen number "86" when the textbook takes the form of an electronic document as viewed on the document reader 10, and in this case the screen number is the page number 134 as far as this disclosure is concerned. Moreover, page or screen numbers need not be displayed on the document reader 10. In this example, page numbers run from 0 to N.

Each page 134 can be assigned a kind 132. Different kinds of pages can include a cover page 140, introduction pages 142, content pages 144, a chapter title page 146, an author biography page 148, and a back cover page 149. Other kinds of pages, which are not illustrated for sake of clarity, include a copyright notification page, preface pages, a dedication page, table of contents pages, intentionally blank pages, and index pages, among others.

Each page 134 can be designated as included or not included in random page selection. Specifically, each page 134 can have an inclusion bit 136 that indicates whether or not the page is to be included in random page selection. When the inclusion bit is 0, the page is not included. When the inclusion bit is 1, the page is included. Inclusion of pages can be on the basis of the kind 132 of page. In this example, it can be seen that only the content pages 144 and author biography page 148 are included. This advantageously prevents pages that may not be of interest to the user from being arrived at randomly when the user is randomly flipping pages. Referring to FIG. 3, the inclusion bits 136 can define the set of viewable pages 54.

The inclusion bits 136 can be automatically set by the processor 20 analyzing the electronic document 30. For example, metadata indicating the kinds of the pages, if available, can be read by the processor 20 to determine the kinds of pages, with the processor 20 automatically setting the inclusion bits 136 for pages of specific kinds. Additionally or alternatively, a word count of each page can be determined by the processor 20, with the processor 20 setting the inclusion bits 136 for pages having more than a threshold number of words. Further additionally or alternatively, the processor 20 can be configured to search for keywords, such as "chapter" or "introduction", in the electronic document 30, with the processor 20 selecting the inclusion bits 136 for pages accordingly. Moreover, the inclusion bits 136 may be preset before the electronic document 30 and accompanying page data 32 is delivered to the electronic reader 10 and thus may be predetermined by the author or publisher. The inclusion bits 136 may also be selectable by the user at the electronic reader 10, in which case the processor's, author's, or publisher's selections can be overridden at the user interface 26.

Each page 134 can also have an indication of whether or not that page has been previously displayed. The viewed indication 138 can be a bit, where a 1 indicates that the page has been displayed and a 0 indicates that the page has not been displayed. When a page is displayed on the display, its viewed indication 138 is changed from 0 to 1. Referring to FIG. 3, the viewed indication bits 138 can define the second set 56 of pages previously displayed.

An index 139 can thus be established for randomly selecting pages to display. The inclusion bits 136 are combined with the viewed indication bits 138 to determine which pages are candidates for random selection. In this example, an exclusive OR (XOR) operation is used to identify such pages. When the result of XOR'ing the inclusion bit 136 with the viewed indication bit 138 is a 1, then the respective page is serially assigned a number in the index 139. Once this operation has been performed for all the pages 134, then a sequentially numbered set of i pages is established from which a random page can be selected. Referring to FIG. 3, the set of pages in the index 139 can define the first set of pages 52.

When direction is to be considered when randomly selecting a page, the index 139 can include positive numbers to indicate one direction and negative numbers to indicate the opposite direction. The number 0 can indicate the current page.

The index 139 thus sets the bounds for random number selection using the random number generator 36. In the example illustrated, a pseudo-random number between 1 and i is selected to determined which page is to be displayed.

FIGS. 9*a*-*b* show arrays 150, 152 for storing page data. The arrays 150, 152 may be used in conjunction with the table 130 or instead of the table 130. The principles discussed with reference to the table 130 may be used to generate or update the arrays 150, 152. The arrays 150, 152 may be stored in the same format as the table 130 or in a different format.

An array of included pages 150 lists the page numbers of pages that can be viewed randomly. The content of the included pages array 150 is thus similar to the pages identified by the inclusion bits 136 (FIG. 8) and the set of viewable pages 54 (FIG. 3). When pages are to be included or added to the array of viewable pages 150, the processor 20 updates the array 150.

An array 152 of previously viewed pages 152 lists the page numbers of pages that have been previously displayed. The content of the viewed pages array 152 is thus similar to the pages identified by the viewed indication bits 138 (FIG. 8) and the second set 56 of previously displayed pages (FIG. 3). As pages are displayed, the processor 20 adds the respective page numbers to the array 152. When a page is to be selected randomly, the processor 20 selects a page number that is in the array 150 but not in the array 152. When a key or index of the array 152 is used to record the order that page numbers are added to the array 12, the array 152 thus also tracks the history of pages viewed and can therefore also be referenced when the processor 20 receives a command to return to a previously displayed page.

Figure 10:
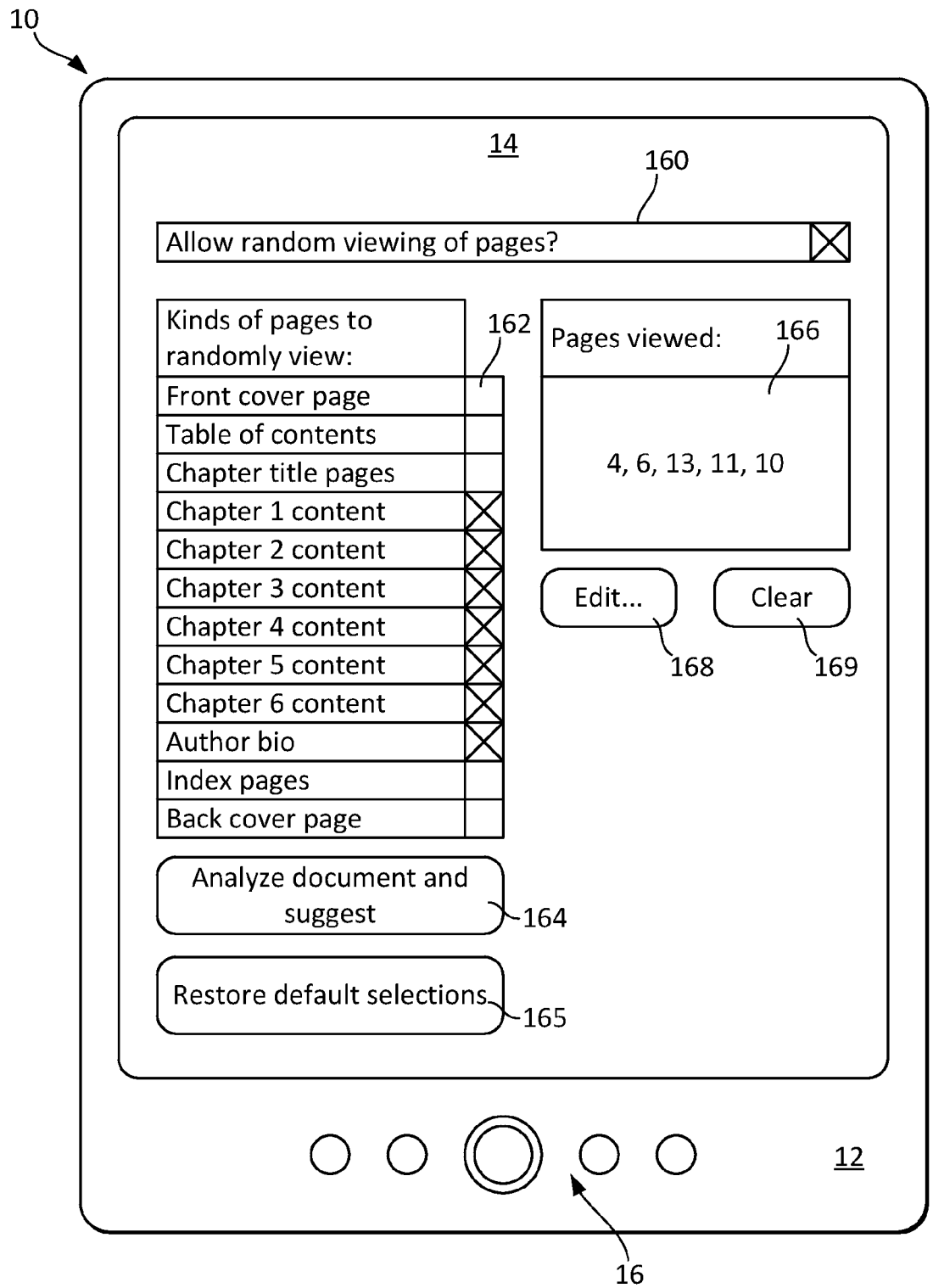
FIG. 10 is a front view of the electronic document reader showing settings for random page turning.

FIG. 10 shows settings that can be configured for the random selection of pages for a specific electronic document 30. Values indicative of the settings selected can be stored in the memory 22 and can be stored in the page data 32.

Whether or not the document reader 10 will allow viewing of random pages can be determined by a control, such as a checkbox 160.

A definition of a first set of pages that are viewable can be indicated by way of controls, such as a series of checkboxes 162, associated with different kinds of pages. More than one page of the electronic document 30 can be selectable by a single checkbox 162. Alternatively or additionally, a control for selecting randomly viewable pages is a textbox listing the pages by number. Another control, such as a button 164, can be provided to trigger the processor 20 to analyze the document and suggest kinds of pages to automatically include as viewable. Another control, such as a button 165, can be provided to reset the selected kinds of pages to the author's or publisher's original selection. Accordingly, the checkboxes 162 may be used to override selections resulting from pressing button 164 or 165.

A definition of a second set of pages that have previously been viewed can be displayed and edited at a control, such as a textbox 166. Another control, such as a button 168, may be required to first be actuated to allow modification of the previously viewed pages listed in the textbox 166. Individual pages numbers or ranges of pages numbers can be added or deleted by way of the controls 166, 168. Another control, such as a button 169, can be provided to empty the second set of previously displayed pages.

The second set of previously displayed pages can also be emptied on other conditions, such as in response to the electronic document 30 entering a loaned state when the electronic document is temporarily loaned to another document reader 10 belonging to another user. This may be particularly useful when the page data 32 accompanies the document 32 or is stored in the document 30 itself.

Other kinds of user interface elements or controls, such as spinners and dropdown selectors, can alternatively or additionally be used.

While the foregoing provides certain non-limiting example embodiments, it should be understood that combinations, subsets, and variations of the foregoing are contemplated. The monopoly sought is defined by the claims.

What is claimed is:

1. A method for turning a page of an electronic document, the method comprising:
displaying a current page of an electronic document on a display;
receiving at a user interface a first command to display a different page of the electronic document on the display;
in response to the first command, a processor using a random number generator to select a new page of the electronic document from a first set of pages of the electronic document, the first set of pages excluding a second set of previously displayed pages of the electronic document; and
displaying the new page on the display.

2. The method of claim 1, further comprising adding the new page to the second set of previously displayed pages.

3. The method of claim 1, further comprising the processor defining the first set of pages by analyzing the electronic document.

4. The method of claim 1, further comprising receiving at the user interface a definition of the first set of pages.

5. The method of claim 1, further comprising the processor emptying the second set of previously displayed pages in response to the electronic document entering a loaned state.

6. The method of claim 1, further comprising receiving at the user interface a modification to the second set of previously displayed pages.

7. The method of claim 1, further comprising, in response to the first command, displaying on the display a graphical element indicative of a number of pages between the current page and the new page.

8. The method of claim 1, wherein the first command indicates a first direction in the electronic document from the current page to the different page.

9. The method of claim 8, wherein the first set of pages further excludes a third set of pages of the electronic document that are not in the first direction.

10. The method of claim 8, further comprising, in response to receiving a second command indicating a second direction different from the first direction while the new page is being displayed on the display, displaying the current page on the display.

11. A method for turning a page of an electronic document, the method comprising:
a processor defining a first set of pages of the electronic document by analyzing the electronic document;
excluding from the first set of pages a second set of previously displayed pages of the electronic document;
receiving at a user interface a first command to display a different page of the electronic document on the display;
in response to the first command, a processor using a random number generator to select a new page of the electronic document from the first set of pages;
in response to the first command, displaying on the display a graphical element indicative of a number of pages from a current page to the new page;
adding the new page to the second set of previously displayed pages; and
displaying the new page on the display.

12. The method of claim 11, wherein the first command indicates a first direction in the electronic document from the current page to the different page, the method further comprising excluding from the first set of pages a third set of pages of the electronic document that are not in the first direction.

13. The method of claim 11, wherein the first command indicates a first direction in the electronic document from the current page to the different page, the method further comprising, in response to receiving a second command indicating a second direction different from the first direction while the new page is being displayed on the display, displaying the current page on the display.

14. An electronic document reader comprising:
a display configured to display at least a page of an electronic document;
a memory configured to store indications of sets of pages of the electronic document;
a user interface for receiving commands; and
a processor connected to the display, the memory, and the user interface, the processor configured to cause pages to be displayed on the display and, in response to a first command, use a random number generator to select a new page to display from a first set of pages, the first set of pages excluding a second set of previously displayed pages.

15. The electronic document reader of claim 14, wherein the processor is further configured to add an indication of the new page to the second set of previously displayed pages.

16. The electronic document reader of claim 14, wherein the processor is further configured to analyze the electronic document to define the first set of pages.

17. The electronic document reader of claim 14, wherein the processor is further configured to define the first set of pages according to a definition received from the user interface.

18. The electronic document reader of claim 14, wherein the processor is further configured to cause the display to display a graphical element indicative of a number of pages between the new page and a current page in response to the first command.

19. The electronic document reader of claim 14, wherein the first command indicates a first direction in the electronic document, and the processor is further configured to exclude from the first set of pages a third set of pages that are not in the first direction.

20. The electronic document reader of claim 14, wherein the first command indicates a first direction in the electronic document, and the processor is further configured to return to a current page in response to receiving a second command indicating a second direction different from the first direction.

* * * * *